United States Patent
Geving et al.

(10) Patent No.: US 6,814,926 B2
(45) Date of Patent: Nov. 9, 2004

(54) METAL POWDER COMPOSITION FOR LASER SINTERING

(75) Inventors: Brad Geving, Newhall, CA (US); Kris Alan Schmidt, Granada Hills, CA (US); Kenneth J. Newell, Valencia, CA (US)

(73) Assignee: 3D Systems Inc., Valencia, CA (US)

( * ) Notice: Subject to any disclaimer, the term of this patent is extended or adjusted under 35 U.S.C. 154(b) by 0 days.

(21) Appl. No.: 10/394,312

(22) Filed: Mar. 19, 2003

(65) Prior Publication Data

US 2004/0184944 A1 Sep. 23, 2004

(51) Int. Cl.$^7$ ................................................. B22F 3/00
(52) U.S. Cl. .............................. 419/5; 419/10; 419/18; 419/23; 419/37
(58) Field of Search .................................. 419/5, 10, 18, 419/23, 37, 36; 75/252

(56) References Cited

U.S. PATENT DOCUMENTS

| | | | |
|---|---|---|---|
| 4,247,508 A | | 1/1981 | Housholder ................. 264/219 |
| 4,327,156 A | * | 4/1982 | Dillon et al. ................ 428/568 |
| 4,554,218 A | | 11/1985 | Gardner et al. ............. 428/567 |
| 4,863,538 A | | 9/1989 | Deckard ...................... 156/622 |
| 4,944,817 A | | 7/1990 | Bourell et al. .............. 156/622 |
| 5,017,753 A | | 5/1991 | Deckard ................. 219/121.63 |
| 5,076,869 A | | 12/1991 | Bourell et al. ............. 156/62.2 |
| 5,296,062 A | | 3/1994 | Bourell et al. ............. 156/62.2 |
| 5,340,656 A | | 8/1994 | Sachs et al. ................ 428/546 |
| 5,387,380 A | | 2/1995 | Cima et al. ................... 264/69 |
| 5,433,280 A | | 7/1995 | Smith ......................... 175/336 |
| 5,544,550 A | | 8/1996 | Smith ........................ 76/108.2 |
| 5,749,041 A | | 5/1998 | Lakshminarayan et al. .... 419/2 |
| 5,839,329 A | | 11/1998 | Smith et al. ............... 76/108.2 |
| 5,950,063 A | * | 9/1999 | Hens et al. ..................... 419/5 |
| 5,989,476 A | * | 11/1999 | Lockard et al. ............. 264/401 |
| 6,045,601 A | * | 4/2000 | Tan ............................. 75/248 |
| 6,048,379 A | * | 4/2000 | Bray et al. .................... 75/229 |
| 6,112,804 A | * | 9/2000 | Sachs et al. ................ 164/348 |
| 6,224,816 B1 | * | 5/2001 | Hull et al. .................. 264/401 |
| 6,399,018 B1 | * | 6/2002 | German et al. ................ 419/2 |
| 6,478,842 B1 | * | 11/2002 | Gressel et al. ............... 75/246 |
| 6,630,009 B2 | * | 10/2003 | Moussa et al. ............... 75/255 |

OTHER PUBLICATIONS

Stein, G. et al., "Current and Future Applications of High Nitrogen Steels," *Materials Science Forum, vols. 318–320 (1999)*, pp. 151–160.

* cited by examiner

*Primary Examiner*—Ngoclan T. Mai
(74) *Attorney, Agent, or Firm*—Ralph D'Alessandro

(57) ABSTRACT

A powder blend for use in laser sintering and a method for forming tough, strong, wear-resistant, corrosion-resistant infiltrated metal products are provided. The powder blend comprises a steel alloy, a polymeric binder and a high melting temperature fine particulate which are blended together, then applied layer by layer to a working surface in a laser sintering system, exposed a layer at a time to fuse together the powder until a green part of high strength is formed, and then the green part is infiltrated with a metal infiltrant in a non-reducing gas atmosphere at an effective temperature for an effective period of time. The preferred steel is a mild steel alloy.

24 Claims, 1 Drawing Sheet

METAL POWDER COMPOSITION FOR LASER SINTERING

BACKGROUND OF THE INVENTION

1. Field of the Invention

This invention relates generally to the field of solid freeform fabrication ("SFF") of parts and more specifically to the powder blend for use in the selective laser sintering process utilizing a steel alloy and the method of forming three-dimensional parts employing that powder blend.

2. Description of the Relevant Art

SFF generally refers to the manufacture of articles in a layer-wise or additive fashion directly from computer-aided-design (CAD) databases in an automated fashion, as opposed to conventional machining of prototype articles from engineering drawings in subtractive processes. SFF has, in recent years, made substantial improvements in providing high strength, high density parts for use in the design and pilot production of many useful articles. As a result, the time required to produce prototype parts from engineering designs has reduced from several weeks, using conventional machinery and subtractive processes, to a matter of hours.

One example of an SFF technology is the selective laser sintering process practiced by systems available from 3D Systems, Inc. of Valencia, Calif. According to this technology, articles are produced in layer-wise fashion from a laser-fusible powder that is dispensed one layer at a time. The powder is fused, or sintered, by the application of laser energy that is directed to those portions of the powder corresponding to a cross-section of the article. After the fusing of powder in each layer, an additional layer of powder is then dispensed, and the process repeated, with fused portions of later layers fusing to fused portions of previous layers (as appropriate for the article), until the article is complete. Detailed description of the selective laser sintering technology may be found in U.S. Pat. Nos. 4,863,538 and 5,017,753, both assigned to Board of Regents, The University of Texas System, and in U.S. Pat. No. 4,247,508, to Housholder. The selective laser sintering technology has enabled the direct manufacture of three-dimensional articles of high resolution and dimensional accuracy from a variety of materials including nylons, polystyrenes, and composite materials such as polymer coated metals and ceramics. Examples of composite powder materials are described in U.S. Pat. Nos. 4,944,817; 5,076,869; and 5,296,062, all assigned to Board of Regents, The University of Texas System, and incorporated herein by reference in pertinent part.

A related SFF technology, referred to as 3-Dimensional (3D) Printing, is described in U.S. Pat. Nos. 5,340,656 and 5,387,380. From a computer (CAD) model of the desired part, a slicing algorithm draws detailed information for every layer. Each layer begins with a thin distribution of powder spread over the surface of a powder bed. Using a technology similar to ink-jet printing, a binder material selectively joins particles where the object is to be formed. A piston that supports the powder bed and the part-in-progress lowers so that the next powder layer can be spread and selectively joined. This layer-by-layer process repeats until the part is completed. Following a heat treatment, unbound powder is removed, leaving the fabricated part.

As SFF technology has evolved, it has increasingly been used not only to make prototype parts but also to make final useful parts as well as tools or molds that can be used to make multiple parts. It is becoming more common to fabricate such parts, tools, or molds with an "indirect" process that uses a powder of metal and/or ceramic particles either coated by or blended with a polymer. The powder is used in the selective laser sintering process to fabricate a "green" article that binds the particles to one another. The green article is then heated to a temperature above the decomposition temperature of the polymer, which both drives off the polymer and also binds the metal and/or ceramic substrate particles to one another to form an intermediate porous article. The porous article can then be infiltrated with another material, such as a lower melting temperature metal to give a fully dense article with desirable properties. The green article can also be fabricated with 3D printing.

Some examples of the use of these approaches for functional applications are described, for example, in U.S. Pat. Nos. 5,433,280: 5,544,550 and 5,839,329 to Smith et al. These describe the use of selective laser sintering a tungsten carbide-polymer composite powder to generate "green" drill bit which is then infiltrated in a furnace cycle with a copper alloy to generate a fully functional drill bit for down hole oil exploration. U.S. Pat. No. 4,554,218 describes the use of a powder mixture having a first metal and a second metal, such as A6 tool steel, and a fugitive binder that is placed in a mold, cured to a green part and then infiltrated with a third metal, preferably a copper or copper-containing alloy, to form an infiltrated, molded metal composite article. Another commercial application of these indirect approaches is a product called ProMetal by ExtrudeHone. Utilizing the 3D Printing technology described above, ProMetal builds metal components by selectively binding metal powder layer by layer. The finished structural skeleton is then sintered and infiltrated with bronze to produce a finished part that is 60% steel and 40% bronze and is used for injection molding tools or final metal parts. Another commercial example is 3D Systems' ST-100 system, which uses selective laser sintering of a steel polymer composite powder to generate a green article. The green article or part is subsequently put through a furnace cycle that removes the polymer binder and infiltrates the metal skeleton with bronze to create a functional fully dense article that can also be used for injection mold tools or final parts.

As is well known in the art, the structural strength of the green article is an important factor in its utility, since weak green articles cannot be safely handled during subsequent operations. Another important factor in the quality of a prototype article is its dimensional accuracy relative to the design dimensions. However, these factors of part strength and dimensional accuracy are generally opposed to one another, since the densification of the powder that occurs in the sintering of the post-process anneal also causes shrinkage of the article. The polymer content of a metal and/or ceramic composite powder described above could be increased in order to provide higher green part strength, but the shrinkage of the part in post-process anneal would increase accordingly. As a result, compromises between article strength and dimensional stability must be made in the design of a composite powder system using a polymeric binder.

Some drawbacks of conventional composite powders incorporating thermoplastic polymer binders have been observed. In the post-process anneal of green articles using such binders, creep deformation has been observed as the article is heated to a temperature above the glass transition temperature of the polymer binder, but below the decomposition temperature at which the binder is released. The viscosity of the polymer decreases to such an extent that the metal or ceramic substrate particles slide past one another under the force of gravity. Not only do the dimensions of the article change as a result of this creep deformation, but also this dimensional change is not uniform. Taller features deform by a larger extent than do shorter features. This non-uniformity in deformation precludes the use of a constant shrinkage correction factor in the selective laser sintering fabrication of the green part, further exacerbating the difficulty of achieving dimensionally accurate articles of high density and strength.

Creep deformation has been observed to deform not only the height but also the shape of vertical features, such as sidewalls. For example, vertical walls of mold cavities formed by selective laser sintering of polymer-coated metal powders, and having a thickness of 0.75 inches and a height of 1.5 inches, have been observed to bow outwardly as a result of creep deformation. The dimensional accuracy of the infiltrated final part is, of course, severely compromised by such deformation.

To address this tendency of creep deformation, another prior art technique was developed that combined the use of a thermoplastic binder with a thermoset binder. This is described in U.S. Pat. No. 5,749,041. In this approach a "green" part is formed by the selective laser sintering of a metal-polymer composite powder, in which the polymer binder is a thermoplastic polymer. Following its fabrication, the green article is infiltrated with a thermosetting material prior to heating the part. The thermosetting material may be an aqueous emulsion of a cross-linkable polymer with a cross-linking agent, or may instead be an aqueous emulsion of only the cross-linking agent. In the first case, the cross-linking agent reacts with the cross-linkable polymer in the infiltrant to form a rigid skeleton for the green article; in the second case, the cross-linking agent reacts with the polymer binder of the green article to form the rigid skeleton. Following the formation of the rigid skeleton, the article may be heated to decompose the polymer and sinter the metal substrate particles, followed by infiltration with a metal for added strength. This prior art approach provided a solution to the creep deformation problem, but added significant time to the post processing of the part to dry out the article after the aqueous infiltration step.

Another approach used commercially to avoid the aforementioned drying step incorporates both a thermoplastic and thermoset binder in the formulation of the metal-polymer composite article. In one successful version a phenolic type thermoset is combined with a wax binder to give a system that provides adequate initial green strength and a more rigid skeleton for the green article. The green strength of this system though, while improved, still suffers from unacceptable failure rates due to breakage of green parts in handling. Thus the search for stronger green part systems has continued.

The trend has been to use more polymer binder materials as one approach to achieve higher green strength parts. However, as the amount and complexity of binders used in these metal and/or ceramic polymer composite powders has increased, it has been increasingly difficult to removing all of the polymer system binders during the decomposition and burn-out phase. The decomposition of the polymer into smaller fragments should be complete enough to ensure that the bulk of the hydrocarbon fragments can escape the article skeleton before the infiltrating metal (copper or bronze, for example) enters the skeleton. If all of the hydrocarbon fragments do not escape, the interconnectivity of pores in the resulting metal part is decreased and outgassing is hampered as the interpassages become blocked by trapped hydrocarbon fragments leading to a phenomena of blistering on the surface and potential delamination of the final article. In some systems the presence of too much residual carbon can also impede the infiltration process. The presence of a reducing atmosphere, such as hydrogen or forming gas helps the polymer degradation greatly, but is a more expensive alternate than a non-reducing gaseous atmosphere.

Accordingly, there is a need to provide an improved powder blend for use in conjunction with laser sintering and an infiltration process to achieve finished articles possessing high strength, enhanced toughness (resistance to crack growth), increased surface hardness, increased corrosion resistance or stainless property and improved surface finish with less distortion and shrinkage during heat treatment and infiltration.

BRIEF SUMMARY OF THE INVENTION

It is an aspect of the present invention to provide a method of fabricating high density and high strength articles and tooling via SFF techniques from powder blend and a powder blend comprising at least a steel alloy selected from the group consisting of mild steel, carbon steel and stainless steel, a polymeric binder and a high melting temperature fine particulate metallic, intermetallic or ceramic with improved initial green strengths.

It is another aspect of the present invention that a metal powder blend is employed which provides improved part building in a laser sintering process.

It is a still another aspect of the present invention to provide such a powder blend comprising at least a steel alloy selected from the group consisting of mild steel, carbon steel and stainless steel, a polymeric binder and a high melting temperature fine particulate metallic, intermetallic or ceramic, and a method using such a powder blend in a laser sintering SFF technique that improves dimensional accuracy.

It is a further aspect of the invention to provide such a method for use in a laser sintering SFF technique while avoiding blistering phenomena even in nitrogen atmospheres.

It is a feature of the present invention that the base alloy is mild steel that yields low shrinkage during infiltration with a preferred metal infiltrant.

It is another feature of the present invention that a preferred infiltrant is copper and/or a copper containing alloy.

It is still another feature of the present invention that the material composition is blended for an extended period of time to break up agglomerations of a high melting temperature fine particulate metallic, intermetallic or ceramic material.

It is a further feature of the present invention that the infiltration occurs in a gas atmosphere.

It is yet another feature of the present invention that the polymeric binder is a co-polymer of nylon 6 and nylon 12.

It is still another feature of the present invention that the metal powder composition is able to employ a lower percentage of binder material to increase the green strength of the part formed from the laser sintering process.

It is an advantage of the present invention that the powder blend and method using such powder blend produce high quality, fine-featured green parts with minimal curl.

It is an another advantage of the present invention that the powder blend and method using such powder blend produce parts after infiltration with excellent surface finish and high hardness.

It is a further advantage of the present invention that the powder blend and method using such powder blend produce parts after infiltration having a desirable balance of toughness, strength and wear resistance.

It is yet another advantage of the present invention that the powder blend and method using such powder blend produce parts with excellent thermal conductivity after infiltration with a copper containing alloy.

It is a further advantage of the present invention that the metal powder composition flows without caking as it is distributed across the part bed of the laser sintering system.

It is yet a further advantage of the present invention that the laser sintered part obtained using the metal powder composition of the present invention has a higher green strength than prior metal compositions despite not employing an increased binder composition.

It is still a further advantage of the present invention that the laser sintered part obtained using the metal powder composition of the present invention is corrosion resistant or possesses stainless property.

The invention may be incorporated into a method of fabricating an article, such as a prototype part or a tooling for injection molding, using selective laser sintering. According to the present invention, the selective laser sintering of a powder blend comprising at least a steel alloy selected from the group consisting of mild steel, carbon steel and stainless steel, a polymeric binder, and a high melting temperature fine particulate metallic, intermetallic or ceramic forms a "green" part. After removal of unfused material from the green part, it is placed in an oven or furnace preferably in a non-reducing atmosphere such as, for example, nitrogen, argon or a nitrogen-argon blend for subsequent heat treatment to decompose and drive off the binder and sinter the metal substrate particles prior to infiltration by a metal with a lower melting point. During the critical step of infiltrating the green part, the green part is packed in a fine grit alumina in a non-reducing gas atmosphere that creates the conditions necessary to provide sufficient surface area to absorb the outgassing of the binder material and prevent redeposit on the part. A preferred steel alloy is a mild steel alloy and a preferred high melting temperature fine particulate is tungsten carbide.

These and other aspects, features and advantages are obtained in the present invention wherein the powder blend for use in a laser sintering process comprises a steel alloy selected from the group consisting of mild steel, carbon steel and stainless steel, a polymeric binder, and a high melting temperature fine particulate metallic, intermetallic or ceramic and the powder blend is employed in a method to form a tough, strong and wear resistant product comprising the steps of:

a. mixing together a powder blend comprising a steel alloy selected from the group consisting of mild steel, carbon steel and stainless steel, a high melting temperature fine particulate metallic, intermetallic or ceramic and a polymeric binder;

b. applying a layer of the powder blend to a working surface in a laser sintering system;

c. exposing the layer of the powder blend to heat energy to fuse together the mild steel alloy and tungsten carbide by the melting and subsequent rehardening of the binder material;

d. applying a new layer of powder blend and exposing the new layer of powder blend in sequential fashion repeatedly until a three-dimensional green metal part is formed; and e. infiltrating a green metal part with metal infiltrant in a non-reducing gas atmosphere at an effective temperature for an effective time period in an oven.

BRIEF DESCRIPTION OF THE DRAWING

These and other aspects, features and advantages of the present invention will become apparent upon consideration of the following detailed disclosure of the invention, especially when it is taken in conjunction with the accompanying drawing, wherein.

DETAILED DESCRIPTION OF THE PREFERRED EMBODIMENT

Figure 1:
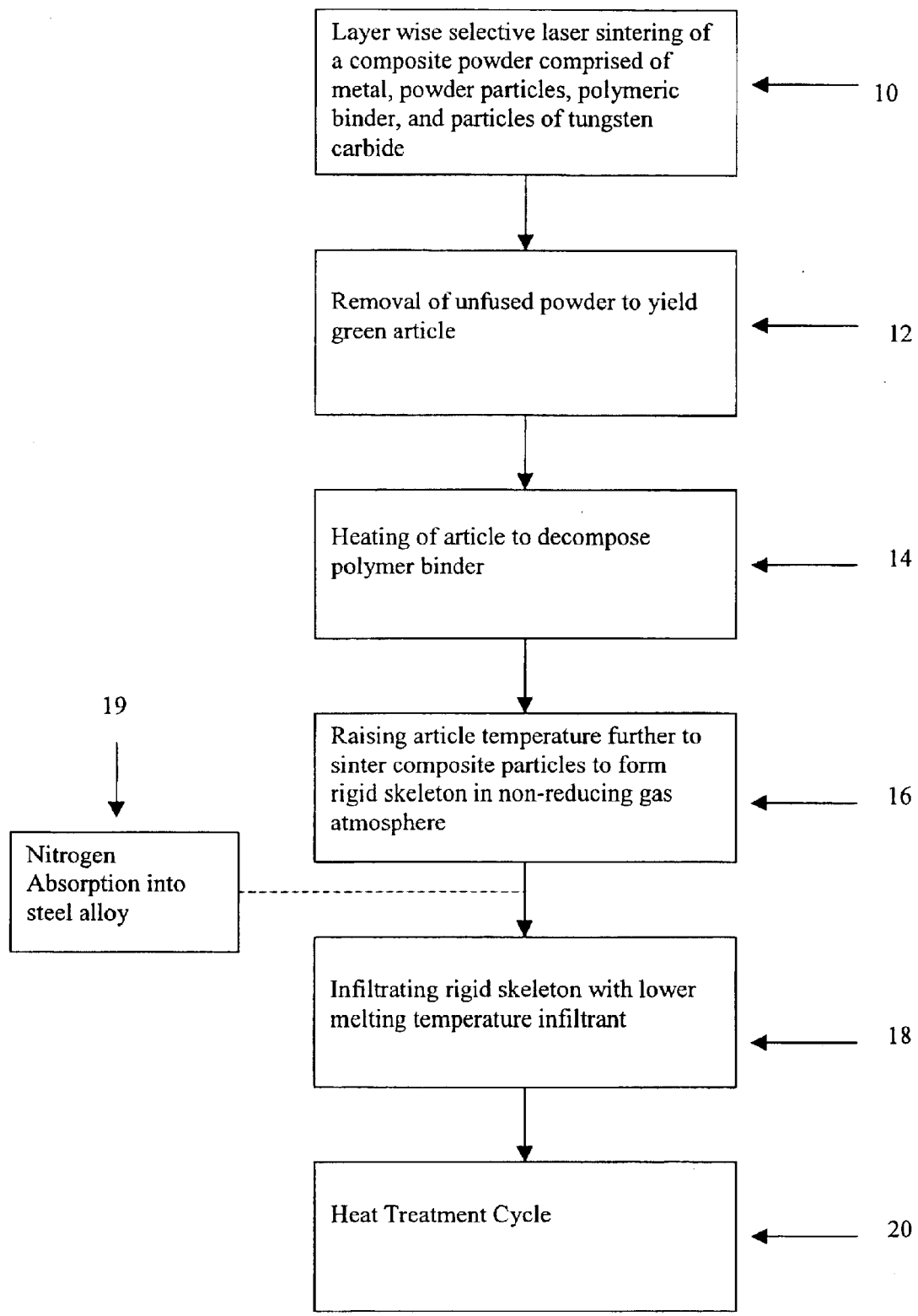
FIG. 1 is a flow diagram illustrating a method of fabricating a three-dimensional object according to an embodiment of the invention.

According to the present invention, three-dimensional objects or articles of complex shapes may be made with high dimensional accuracy and good part strength both in their green state and also as finished articles. It is to be understood that, while the present invention is particularly useful in the fabrication of prototype injection molds and tooling, the present invention may also be used to advantage in the fabrication of prototype parts, such as used in the modeling of mechanical systems. Indeed, it is contemplated that the selective laser sintering process and the method of the present invention may be used to manufacture end use articles and parts therefor, particularly in custom or limited runs, as economics permit. As such, the use of the term "article" in this description will be employed to refer either to a part (prototype or end-use), or to tooling for injection molding, thus encompassing various eventual uses of the article.

Referring now to FIG. 1, a method of fabricating a three-dimensional object or article according to a first embodiment of the invention will now be described in detail. The method begins with process 10, which is the selective laser sintering of a blended metal powder to form a "green" article. The term "green" refers to the intermediate state of the article, prior to its densification as will be described hereafter.

The powder blend used in process 10 according to this embodiment of the invention is a metal powder blended with or coated by a polymeric binder system and also includes a high melting temperature fine particulate metallic, intermetallic or ceramic. The metal is a steel alloy and can be a stainless, carbon or a low alloy or mild steel. Carbon steels are steels containing less than about 2% by weight total alloying elements and low alloy or mild steels are steels containing an alloy content from about 2.07% to about 10% by weight total alloy content. Stainless steels contain at least 11% by weight chromium. The metal preferably is a mild steel alloy. Alternate suitable metals can include, for example, 17-4 PH (precipitated hardened) steel or 316 stainless steel. The polymeric binder system may use thermoplastics, thermosets, or a combination thereof. The binder system preferably is a thermoplastic, such as a copolymer of nylon. Optionally a flow agent may be used in the blend. Where one is used, fumed silica can be employed such as Cabosil 720 available from Cabot Corporation.

The alloy has a particle size ranging from less than about 90 $\mu$m (microns) to about 4 $\mu$m, more preferably from less than about 75 $\mu$m to about 8 $\mu$m, and most preferably is less than or equal to about 45 $\mu$m. The steel alloy is deagglomerated by an appropriate deagglomerating technique, including but not limited to blending, mixing and attriting, prior to blending to obtain the desired particle size range. The individual particles of steel alloy preferably are spherical. Use of spherical particles appears to obviate or at least lessen the need for separate flow agents since the powder blend does not cake during its distribution or spreading across the powder bed in the laser sintering system. A preferred suitable mild steel alloy is A6 steel powder available from the Stellite Division of Cabot Corporation or from UltraFine Powder Technologies. A6 steel powder is an air-hardening tool and die steel with non-deforming properties with especially attractive properties for many die and mold applications.

The polymeric binder system is selected from the group consisting of polyethylene, polypropylene, polyacetal, polyrnethacrylate, polyvinylacetate; co-polymers of polyethylene, polypropylene, polyacetal, polyrnethaerylate, polyvinylacetate, nylon; wax; phenolic and combinations thereof. More preferably the binder system utilizes polymers and co-polymers of nylon, such as ones selected from the group consisting of co-polymers of nylon 6, nylon 9, nylon 10, nylon 11, and nylon 12. Most preferable are co-polymers of nylon 6 and nylon 12, such as nylon 6, 12. Nylon homopolymners may also be appropriate, such as nylon 6 or nylon 12. The polymeric binder must melt and freeze or recrystallize between about 75° C. and about 200° C. and more preferably between about 100° C. and about 150° C. to obtain optimal processing. It is therorized that a co-polymer having a lower melt viscosity facilitates optimal processing.

The powder blend also includes a high melting temperature fine particulate metallic, intermetallic or ceramic which has a particle size less than about 10 microns and more preferably less than about 2 microns. The high melting temperature fine particulate metallic, intermetallic or ceramic comprises greater than about 5 percent and less than about 15 percent by weight of the powder blend, more preferably between about 6 to about 9 percent by weight of the powder blend and most preferably comprises about 8 percent by weight of the powder blend. Suitable high melting temperature fine particulate metallic, intermetallic or ceramic materials include tungsten, tantalum, hafnium, rhenium, molybdenum, titanium aluminides, silicon carbide, tungsten carbide, boron carbide, alumina and diamond. A high melting temperature is deemed within the context of the present invention to be a temperature less than about 1500° C. and as a general guide should be about 1.5 times the infiltration temperature required to have the metal infiltrant effectively infiltrate the green part formed using the powder blend. The high melting temperature fine particulate metallic, intermetallic or ceramic is deagglomerated during blending to obtain the desired particle size range. The presence of the high melting temperature fine metallic, intermetallic or ceramic particles in the powder blend minimizes distortion in the finished infiltrated articles by controlling the formation of diffusional necking or surface diffusional neck growth in the solid phase between the particles of the steel alloy. The high melting temperature fine particulate limits the occurrence of solid phase diffusional sintering among the steel alloy particles. The high melting temperature fine particulate metallic, intermetallic or ceramic also contribute to the increased green strength of the preformed articles. A preferred high melting temperature fine particulate is tungsten carbide.

Using particle sizes for the steel alloy and the high melting temperature fine particulate as described prevents gouging or streaking of the powder bed in the laser sintering system that will occur with large sized particles during the application of the powder blend to the working surface of the powder bed.

Selective laser sintering process 10 is preferably performed in a modern selective laser sintering apparatus, such as the VANGUARD™ system available from 3D Systems, Inc. of Valencia, Calif. As described in the above-referenced patents, process 10 fabricates the green article in a layer wise fashion, by first preheating the powder bed and then dispensing a thin layer of the powder over a target surface, preferably in a controlled environment. Laser energy is then applied to selected locations of the powder layer to fuse, or sinter, the powder in the exposed areas. According to the present invention, the powder is a blend or composite powder of metal particles, polymeric binder particles and high melting temperature fine metallic, intermetallic or ceramic particles. The powder particles are fused to one another by the melting and cooling of the polymeric binder, rather than by sintering of the metal substrate particles, which would require very high laser power or very slow processing. The selected locations of the powder layer correspond to those portions of the layer in which the article is to be formed, as defined by a computer-aided-design (CAD) data base representation of the article. After the selective fusing of a layer, a subsequent layer is dispensed over the previously processed layer, and the selective fusing is repeated in the new layer at locations of the layer corresponding to the CAD "slice" of the article to be formed therein. Those portions of a layer that overlie fused portions of the powder in the prior layer are bonded to the fused portions in the prior layer, such that a solid three-dimensional object or article results. The unfused powder in each layer serves as a support medium for subsequent layers, enabling the formation of overhanging elements in the article. As a result of process 10, the green article is formed to the desired size and shape.

It is contemplated that the particular settings and operating parameters of the selective laser sintering system used in process 10 may be readily selected by one of ordinary skill in the art. These parameters include such items as the laser power, laser scan rate, ambient chamber temperature, layer thickness and the like. Typically, the values of these operating parameters are optimized for a given commercially-available powder, such as the composite powder described above, according to documentation provided by the system manufacturer.

Other thermal-based additive processes may alternatively be used to form the green article. For example, it is contemplated that process 10 may be performed by the layer wise masked flood exposure of the composite powder to light, so that the portions of the powder to be fused are exposed to the light and the unfused portions are masked therefrom.

Upon completion of process 10, process 12 is then performed to remove the unfused or unsintered powder from around the article in the conventional manner. Such removal is commonly referred to as "rough break-out", and generally involves the mechanical removal of the unfused powder to yield the green article. Further surface finishing of the green article may be performed at this time, if desired.

Upon completion of process 12, process 14 is then performed. In process 14 the green article is placed in a non-reducing gas, preferably nitrogen, atmosphere in an oven or furnace, usually packed in inert powder packing made up of fine alumina or silica powders to provide support during the subsequent heating steps. The fine grit alumina is −240 mesh so that it provides the needed surface area to absorb outgassing during the oven cycle and prevent any redeposit of outgassed carbon on the surface of the article. The absorption of the outgassing prevents surface blistering of the final infiltrated article due to residual carbon material being forced to the surface during final infiltration. A lower melting infiltrant material, such as copper or a copper-containing alloy such as bronze, is placed in the oven or furnace in contact with the green article. During process 14 the temperature of the objects or articles in the oven or furnace is raised about 90° C. per hour to a temperature of about 550° C. This first temperature is high enough to begin to decompose the polymeric binder present.

After process 14, process 16 is performed; the temperature of the oven or furnace is raised to increase the temperature of the article further to begin a preliminary sintering of the composite articles to form a rigid skeleton. The temperature of the object is raised from about 550° C. to about 850° C. over about a three hour period. The articles are maintained at this temperature for about four hours to permit absorption of nitrogen gas and vapor phase sintering to occur. The high melting temperature fine particulate, such as tungsten carbide, positioned at the iron particle interface facilitates vapor phase diffusional neck growth and reduces solid phase diffusional neck growth of the steel alloy particles, such as mild steel. These now stronger articles are often referred to as brown parts or brown articles.

After process 16, the temperature of the oven or furnace is raised to a peak temperature of about 1070° C. over about a two and one half period and is held at that temperature for about 3–4 hours to perform process 18. Now the presence of the high melting temperature fine metallic, intermetallic or ceramic particles, such as tungsten carbide, positioned along interstitial spaces of the articles reduces liquid phase sintering shrinkage and distortion of the steel alloy particles. Process 18 causes the infiltrant that was placed in the oven or furnace in contact with each article to melt and spontaneously infiltrate the brown article, resulting in a fully dense article. The infiltration process dissolves iron from a tab that is in contact with each article producing a ternary alloy of copper, tin and iron. The solubility of the iron into the copper can be as high as about 6 to about 7 percent by weight of the copper in the final article. The entire oven cycle process of binder removal, sintering, infiltration and cool down to room temperature can span from about 20 to as long as about 30 hours, dependent upon the volume of the part or article being formed.

An additional heat treatment process 20 can then be performed to further harden the articles. After the articles from process 18 have been cooled to room temperature, they are placed in a preheated oven in an air atmosphere and over about a 15 minute period brought from room temperature to a temperature of about 700° C. Thereafter the temperature is gradually raised from 700° C. to 840° C. over a two hour period. The articles are then left at this temperature for one hour. The atmosphere in the oven or furnace is then quenched with a room temperature (about 250° C.) gas, preferably a nonreducing gas such as nitrogen, argon or a nitrogen argon blend to bring the temperature of the articles down to about 93° C. over about a 15 minute period. The articles are then cooled to about 38° C. over a 15 to 20 minute period and then sub-cooled for about 90 minutes in the non-reducing gas to about −79° C. The articles are returned to room temperature and then are tempered for about 3 hours at about 163° C. Alternatively the quenching gas could be hydrogen or a hydrogen blend, such as argon hydrogen or nitrogen hydrogen. However, the use of a hydrogen or hydrogen blend gas causes the scale that is formed on the surface of the article from carbon residue stemming from deposits of the binder material to be reduced away. The presence of the carbon residue scale prevents the copper in the copper or copper-containing infiltrant from wicking to the surface of the article.

An additional nitrogen absorption cycle 19 can also be performed before the infiltration process 18 is performed by holding the articles above about 900° C. for about 4–6 hours. This process converts a mild steel alloy into a corrosion-resistant steel by the absorption of the nitrogen during the heat up stage when nitrogen is used as the non-reducing atmosphere. While not being bound by theory, it is theorized that the process involves the solid state formation of a higher nitrogen stainless steel because the nitrogen is absorbed into the ferritic body-center-cubic alloy so that at about 910° C. the ferritic iron begins a slow phase transformation to an austenitic face-center-cubic. It is believed this slow and brief transformation opens the surface and grain boundary crystal lattice for the inward diffusion of the nitrogen, forming an in situ A6 stainless steel. It is theorized that upon slow cooling, the austenitic face-center-cubic structure may transform back to the ferritic body-center-cubic structure with what appears to be a supersaturated level of nitrogen.

A preferred example of a composite powder to be used in the selective laser sintering process that is useful in connection with this embodiment of the invention has a substrate of a mild steel powder, such as spherical particles of −325 mesh, 45 micron, A6 tool steel powder from Ultrafine Powder Technologies of Woonsocket, Rhode Island, a polymeric binder system made up of about 1.25% to about 2.25% and more preferably about 1.6% to about 2.1% by weight of 3501UD nylon 6,12 co-polymer available commercially from Atofina Chemicals, Inc. of Philadelphia, Pa.; and about 8% by weight of less than 2 microns tungsten carbide from Teledyne Inc. of Huntsville, Ala. The polymer binder is preferably blended with the A6 mild steel alloy and tungsten carbide powder substrate particles. The resultant infiltrated articles have a smoother surface finish than previous powder blends and methods, achieving a surface finish of about 3.5 $\mu$mRa without the presence of bronze bleed through to the surface in parts that can be machined like higher grade steels. The final infiltrated articles are heat treatable and ASTM 638 tensile samples yielded air hardening to a Rockwell hardness ($R_c$) of 15–30, possess a tensile yield strength of 60 Ksi (413 Mpa), a tensile ultimate strength of 105 Ksi (735 Mpa), a modulus of 20.5 Msi (180 Gpa), a maximum percentage of elongation of about 4.0, a thermal conductivity of about 3840 W/m-C at 200° C., linear shrinkage of<2% and an accuracy of±0.005 inch per inch. Accuracy is defined as dimensional variation from part to part of the same feature or variation from the desired dimension.

It should be recognized that other waxes, polyamides, and phenolics could be combined into workable systems for the purposes of this invention. In addition, other thermoplastics could be substituted for the polyamide and other thermosets for the phenolic.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed:

1. A method of forming a tough, strong, wear-resistant, corrosion-resistant, infiltrated metal product comprising the steps of;

a. mixing together a powder blend comprising about 88.75 to about 92.75 weight percent steel alloy selected from the group consisting of a mild steel alloy, a carbon steel and a stainless steel, about 1.25 to about 2.25 weight percent polymeric binder and about 6 to about 9 percent high melting temperature fine particulate;

b. applying a layer of the powder blend to a working surface in a laser sintering system;

c. exposing the layer of the powder blend to heat energy to fuse together the steel alloy and high melting temperature fine particulate by the melting and subsequent rehardening of the binder material;

d. applying a new layer of powder blend and exposing the new layer of powder blend in sequential fashion repeatedly until a three-dimensional green metal part is formed; and e. infiltrating a green metal part with metal infiltrant in a gas atmosphere at an effective temperature for an effective time period.

2. The method according to claim 1 further comprising using mild steel alloy as the steel alloy and tungsten carbide as the high melting temperature fine particulate.

3. The method according to claim 1 further comprising using copper and/or copper containing alloys as a metal infiltrant.

4. The method according to claim 3 further comprising using a gas selected from the group consisting of nitrogen, argon, or a nitrogen argon blend as the gas atmosphere during infiltration.

5. The method according to claim 4 using nitrogen as the gas atmosphere during infiltration.

6. The method according to claim 4 further comprising performing the infiltrating using an infiltration cycle having a peak temperature of about 1070° C.

7. The method according to claim 1 further comprising exposing the infiltrated green metal part to a heat treatment cycle.

8. The method according to claim 5 further comprising using a fine grit alumina packing medium as a support material to encase the green metal part during infiltration.

9. The method according to claim 2 further comprising using a powder blend having about 8 weight percent high melting temperature fine particulate, about 1.6 to about 2.1 weight percent nylon binder, and the remainder a mild steel alloy.

10. The method according to claim 9 further comprising deagglomerating the mild steel alloy to a range in size from less than about 90 microns to about 4 microns.

11. The method according to claim 9 further comprising deagglomerating the mild steel alloy to a range in size from less than about 75 microns to about 8 microns.

12. The method according to claim 10 further comprising deagglomerating the high melting temperature fine particulate.

13. The method according to claim 12 further comprising using a high melting temperature fine particulate having a particle size less than about 10 microns.

14. The method according to claim 7 further comprising performing the heat treatment cycle having a peak temperature of about 840° C. for at least one hour, quenching the infiltrated part with room temperature nitrogen to reduce the part temperature over an effective time, sub-cooling the part to about −79° C. over at least a 90 minute period, returning the part to room temperature, and tempering the part for about 3 hours at about 163° C.

15. The method according to claim 1 further comprising prior to infiltrating, absorbing nitrogen into a mild steel alloy in the green metal part.

16. The method according to claim 15 further corn rising prior to infiltrating, maintaining the green metal part at a temperature in excess of about 850° C. and less than about 900° C. for about 4 to about 6 hours in a nitrogen atmosphere.

17. A method of forming a tough, strong, wear-resistant, corrosion-resistant, infiltrated metal product comprising the steps of:

a. mixing together a powder blend comprising from 88.75 to 92.75 weight percent consisting of a mild steel alloy, a carbon steel and a stainless steel about 1.25 to about 2.25 weight percent polymeric binder and about 5 to about 10 weight percent high melting temperature line particulate, the high temperature melting particulate further being a metallic, intermetallic or ceramic material selected from the group consisting of tungsten, tantalum, hafnium, rhenium, molybdenum, titanium aluminide, silicon carbide, boron, tungsten carbide, boron carbide, alumina and diamond;

b. applying a layer of the powder blend to a working surface in a laser sintering system;

c. exposing tie layer of the powder blend to heat energy to fuse together the steel alloy and high melting temperature fine particulate by the melting and subsequent rehardening of. tire binder material;

d. applying a new layer of powder blend and exposing the new layer of powder blend in sequential fashion repeatedly until a three-dimensional green metal part is formed; and e. infiltrating a green metal part with metal infiltrant in a gas atmosphere at an effective temperature for an effective time period.

18. The method according to claim 17 further comprising using mild steel alloy as the steel alloy and tungsten carbide as the high melting temperature fine particulate.

19. The method according to claim 17 further comprising using a gas selected from the group consisting of nitrogen, argon, and a nitrogen argon blend as the gas atmosphere during infiltration.

20. The method according to claim 18 further comprising deagglomerating the mild steel alloy to a range in size from less than about 90 microns to about 4 microns.

21. The method according to claim 19 further comprising performing the infiltrating using an infiltration cycle having a peak temperature of about 1070° C.

22. The method according to claim 21 further comprising exposing the infiltrated green metal part to a heat treatment cycle.

23. The method according to claim 22 further comprising using a fine grit alumina packing medium as a support material to encase the green metal part during infiltration.

24. The method according to claim 23 further comprising using copper and/or copper containing alloys as a metal infiltrant.

* * * * *

UNITED STATES PATENT AND TRADEMARK OFFICE
CERTIFICATE OF CORRECTION

PATENT NO.   : 6,814,926 B2
DATED        : November 9, 2004
INVENTOR(S)  : Geving et al.

It is certified that error appears in the above-identified patent and that said Letters Patent is hereby corrected as shown below:

Column 7,
Line 13, "consisting of polyethylcne" should read -- consisting of polyethylene --.
Lines 14 and 15, "polyrnethacrylate" should read -- polymethacrylate --.
Line 22, "homopolymners" should read -- homopolymers --.
Line 26, "therorized" should read -- theorized --.

Column 10,
Line 44, "about 3840" should read -- about 38-40 --.

Column 12,
Line 7, "further corn rising" should read -- further comprising --.
Line 16, "weight percent consisting of" should read -- weight percent steel alloy selected from the group consisting of --.
Line 28, "exposing tie layer" should read -- exposing the layer --.
Line 31, "of .tire binder" should read -- of the binder --.

Signed and Sealed this

Twenty-first Day of February, 2006

JON W. DUDAS
*Director of the United States Patent and Trademark Office*